United States Patent [19]
Hurford et al.

[11] Patent Number: 5,718,450
[45] Date of Patent: Feb. 17, 1998

[54] INFLATABLE RESTRAINT SYSTEM HAVING A HEAD/THORAX CUSHION FOR SIDE IMPACT PROTECTION

[75] Inventors: Jonathan P. Hurford, Lake Orion; Mohamed Boumarafi, Rochester Hills, both of Mich.; Ross J. Laming, High Point, N.C.; Aaron E. Bowen, Grand Blanc, Mich.

[73] Assignee: Takata, Inc., Aubrun Hills, Mich.

[21] Appl. No.: 588,760

[22] Filed: Jan. 19, 1996

[51] Int. Cl.[6] .................................................. B60R 21/22
[52] U.S. Cl. .................................... 280/730.2; 280/743.1
[58] Field of Search ........................... 280/730.1, 730.2, 280/743.1, 743.2, 729, 739

[56] References Cited

U.S. PATENT DOCUMENTS

| | | | |
|---|---|---|---|
| 3,573,885 | 4/1971 | Brawn | 280/739 |
| 3,642,303 | 2/1972 | Irish et al. | 280/730.1 |
| 4,262,931 | 4/1981 | Strasser et al. | 280/729 |
| 4,805,930 | 2/1989 | Takada | 280/739 |
| 5,112,079 | 5/1992 | Haland et al. | |
| 5,219,179 | 6/1993 | Eyrainer et al. | 280/743.1 |
| 5,324,072 | 6/1994 | Olson et al. | |
| 5,524,924 | 6/1996 | Steffens et al. | 280/730.2 |
| 5,556,128 | 9/1996 | Sinnhuber et al. | 280/730.2 |
| 5,586,782 | 12/1996 | Zimmermann et al. | 280/730.2 |

FOREIGN PATENT DOCUMENTS

| | | | |
|---|---|---|---|
| 2944319 | 5/1981 | Germany | 280/743.1 |
| 6-227348 | 8/1994 | Japan | 280/730.2 |

*Primary Examiner*—Paul N. Dickson
*Attorney, Agent, or Firm*—Hanress, Dickey & Pierce, PLC

[57] ABSTRACT

An inflatable restraint system having a head/thorax air bag cushion configured to protect the head and thorax regions of a motor vehicle occupant during a side impact collision. The air bag is configured to be kidney shaped when inflated to optimize the protection area while eliminating excess volume. The air bag is inflated from the bottom up, thus inflating the region adjacent the thorax area of the occupant first. As the thorax area is loaded by the occupant, gas is forced into the head area of the air bag. As the head area is loaded by the occupant, gas is vented to atmosphere through vents located in the head area of the air bag.

10 Claims, 5 Drawing Sheets

INFLATABLE RESTRAINT SYSTEM HAVING A HEAD/THORAX CUSHION FOR SIDE IMPACT PROTECTION

FIELD OF THE INVENTION

The present invention relates to motor vehicle safety devices. More particularly, the present invention relates to deployable restraint systems especially adapted for providing side impact protection for the head and thorax of a vehicle occupant.

BACKGROUND OF THE INVENTION

In the past several decades, automotive manufacturers have made great strides in enhancing the safety of motor vehicles in terms of impact protection. While seat belt systems provide a high degree of occupant impact protection, deployable impact protection devices such as inflatable air bags are now in common place use in motor vehicles. Air bags for the driver and passenger side front seat occupants are commonly found in vehicles today.

Motor vehicle manufacturers and their suppliers of safety systems are increasingly focusing on deployable devices providing side impact protection. Statistically, side impacts pose a greater probability of causing significant occupant injury as compared with frontal impacts. This difference is largely due to the limited energy absorption structure available in side impact situations, especially for the "on side" occupant. In response to this concern, vehicle manufacturers and suppliers are developing side impact air bags which are mounted either to the door or body pillar structure, or to the seat back of the occupant seat. In response to a signal from a crash sensor, an inflator generates gas. The expanding gas fills a woven fabric air bag which fills an area between the door and occupant.

Systems have been proposed in which multiple inflatable air bags are arranged inside a motor vehicle to be inflated to protect an occupant of the vehicle during a side impact collision. Generally, an air bag is provided which inflates between the occupant and the side door of the vehicle to provide protection for the torso and pelvic region of the occupant. It has been proposed to implement a second air bag or window curtain to provide protection for the head and neck area of the occupant.

The timing of a side impact air bag system is very critical to the success of the cushioning device. For a typical side impact, the air bag system must sense the crash and deploy the air bag within 8-12 ms. Therefore, any delay in the deployment of the air bag could cause a decrease in the amount of protection given by the air bag device. Accordingly, thus far systems providing a single air bag for protecting both the head and thorax region of an occupant have not been successful.

In motor vehicle design today, size and mass constraints are of critical importance. This is especially true for the side frame and seat back area of an automobile body where there is a very tight packaging space. Traditionally, in order to fill a single air bag having a volume large enough to protect both the head and thorax region of an occupant, a very large inflator was required to produce enough gas to fill the air bag. Therefore, in order to produce an effective restraint system to meet the size and mass constraints associated with side impact restraint systems, air bag and inflator size must be limited.

Furthermore, in order to be cost effective, the design of a deployable side impact restraining device should be applicable across many vehicle platforms and provide low cost fabrication and assembly, with high quality and reliability. Therefore, systems using multiple air bags and modules are highly cost prohibitive due to the expense associated with making, installing and maintaining the multiple modules.

Thus, there is a need for an improved inflatable restraint system for providing protection for the head/thorax region of a vehicle occupant during side impact collisions. There is also a need for a single air bag for protecting the head/thorax region of a vehicle occupant which can be quickly inflated to meet the timing constraints imposed by side impact collisions. There is a further need for an air bag module including a single head/thorax cushion for side impact protection which meets the minimal packing space requirements for installation in the seat back or side frame area of a motor vehicle. There is a still further need for an inflatable restraint system for protecting the head/thorax region of a vehicle occupant which is cost effective.

SUMMARY OF THE INVENTION

The present invention provides an improved inflatable restraint system with a single inflatable air bag which deploys into an area between the occupant and the side door of the motor vehicle upon sensing a side impact collision. The air bag is kidney shaped when inflated and covers an area generally extending from the occupant's hip to the occupant's head without containing excess volume which would require additional time to inflate.

One object of the present invention is to provide an improved inflatable restraint system for protecting the head/thorax region of a motor vehicle occupant during a side impact collision.

Another object of the present invention is to provide a single air bag for protecting the head/thorax region of a vehicle occupant which can be quickly inflated to meet the timing constraints imposed by side impact collisions.

It is a further object of the present invention to provide an air bag module including a single head/thorax cushion for side impact protection which meets the minimal packing space requirements for installation in the seat back or side frame area of a motor vehicle.

It is a still further object of the present invention to provide an inflatable restraint system for protecting the head/thorax region of a vehicle occupant which is cost effective.

In order to achieve the foregoing objects, the present invention provides an inflatable head/thorax cushion for use during side impact collisions for protecting the head/thorax region of a motor vehicle occupant. The air bag is inflated from the bottom up thus inflating the region adjacent the thorax area of the occupant first. As the thorax area is loaded by the occupant and door intrusion from the impacting vehicle, gas is forced into the head area of the air bag. As the head area is loaded by the occupant, gas is vented to atmosphere through vents located in the head area of the air bag. The air bag is designed to be kidney shaped when inflated to optimize the protection area while eliminating excess volume. By eliminating the excess volume, timing and size constraints presented by side impact restraint systems can be met without compromising occupant safety.

In another embodiment, the air bag is configured having separate thorax and head chambers. A divider is provided between the chambers and is configured to ensure that the thorax chamber is filled before the head chamber. Upon loading of the thorax chamber by the occupant, the divider allows gas to flow into the head chamber thus inflating the head chamber. A vent in the head chamber is configured to vent gas from the head chamber to atmosphere when the head chamber is loaded by the occupant thus preventing the air bag from bursting. Several embodiments of the dividers can be used including a breakaway sew line or a panel of material having a one-way flow orifice.

Generally, the thorax chamber comprises the lower two-thirds of the total air bag volume. In the present invention, it is possible to use an inflator having the output capabilities required to fill only the thorax chamber. Furthermore, the bag fill time is equal to that of other air bags having a volume equal to the volume of the thorax chamber. This is due to the fact that only the thorax chamber needs to be filled by the inflator. The head chamber is filled by gas which flows from the thorax chamber as the thorax chamber is loaded by the vehicle occupant and door intrusion. Therefore, it is possible to implement the present invention within the timing and size constraints presented by side impact restraint systems.

The present invention is designed to contain gas longer for improved protection. The flow of gas into the head chamber is delayed for improved head protection in higher speed impacts and the single bag design reduces the manufacturing, installation and maintenance costs of the system making it cost effective. Furthermore, the efficient air bag shape design and inflation techniques allow for the use of larger bag volumes to protect larger occupants such as a 95th percentlie male.

Further objects, features and advantages of the invention will become apparent from a consideration of the following description and the appended claims when taken in connection with the accompanying drawings.

DETAILED DESCRIPTION OF THE PREFERRED EMBODIMENT

Preferred embodiments of the head/thorax cushion for side impact protection are described herebelow with reference to the drawings.

Figure 1:
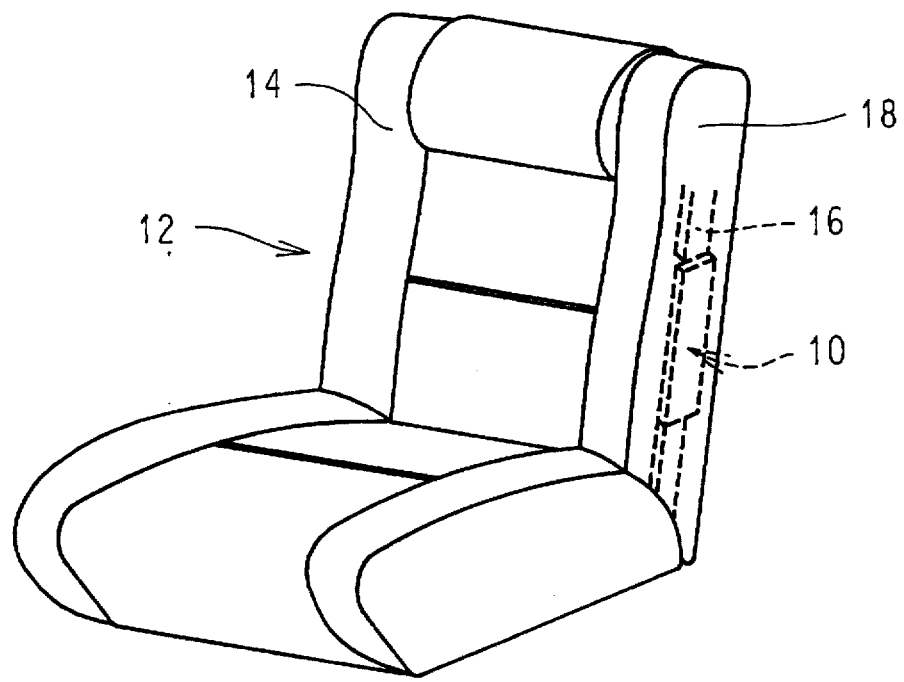
FIG. 1 is a pictorial view of a driver side motor vehicle front seat showing in phantom lines the internally mounted inflatable restraint module in accordance with this invention.
Figure 2:
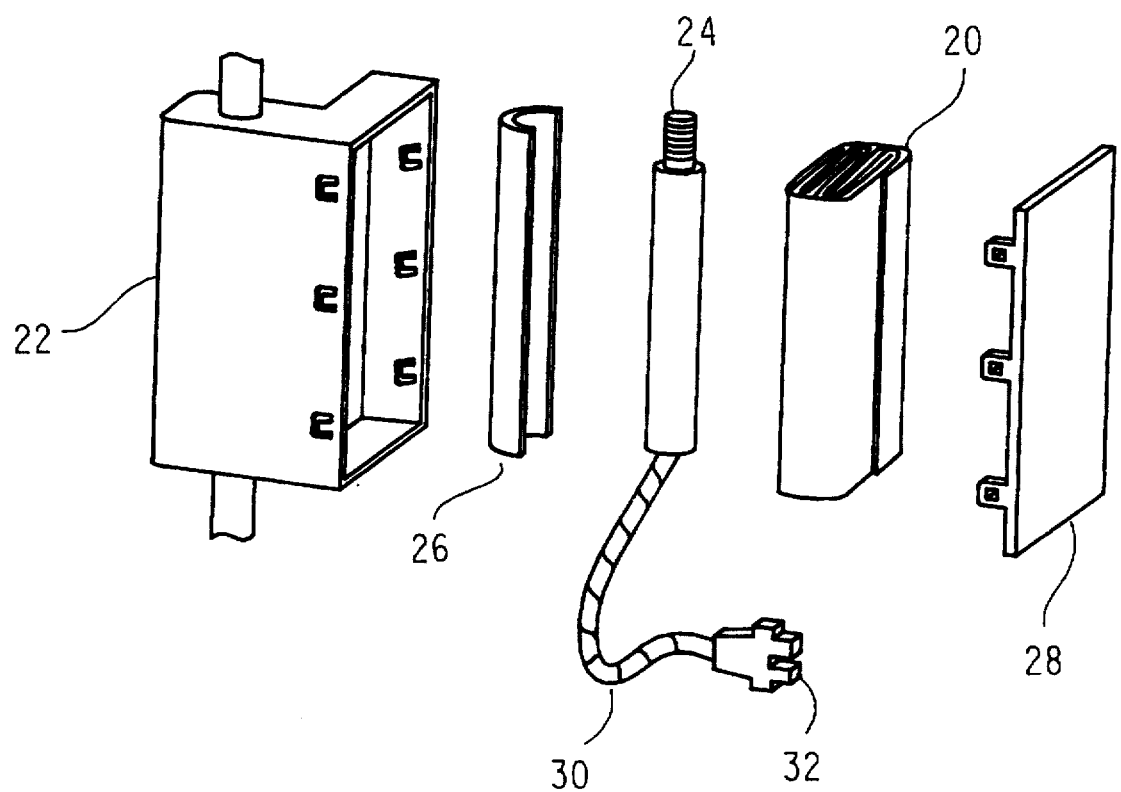
FIG. 2 is an exploded view of the inflatable restrain module of FIG. 1.
Figure 3:
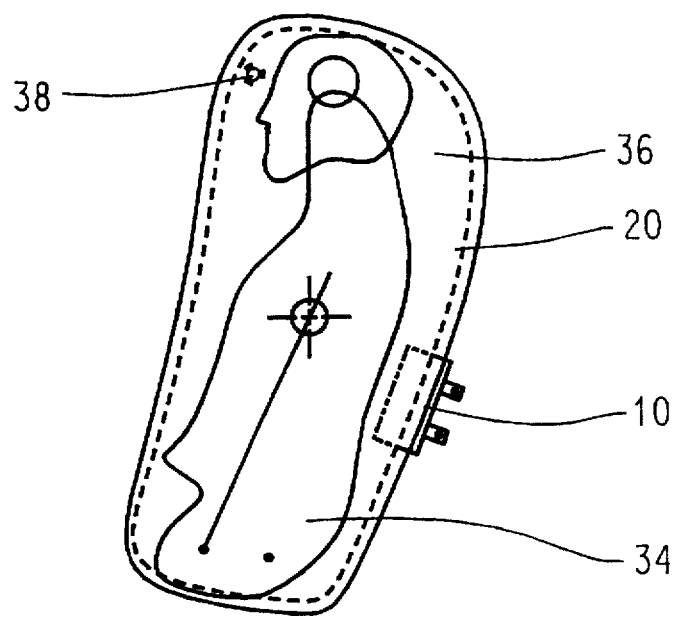
FIG. 3 is a schematic side view of the coverage zone of the head/thorax air cushion in accordance with this invention.

Referring to FIGS. 1 and 2, a side impact air bag module is designated generally by reference number 10. FIG. 1 illustrates the module 10 mounted within a motor vehicle seat 12 which is shown as a driver-side seat. The module 10 can also be adapted to be mounted in the side door or "B" pillar of the motor vehicle. The module 10 is mounted internally with the seat back 14 and is fastened to a generally vertically extending seat back frame member 16. The module 10 and seat frame 16 are surrounded by soft foam material covered externally by trim 18. In accordance with conventional inflatable restraint design concepts, the trim 18 features a tear seam which allows the trim 18 to open thus allowing the air bag 20 to deploy outside of the module 10.

The air bag module 10 is shown in an exploded pictorial fashion in FIG. 2. As shown, module 10 is structurally mounted to the seat 12 by affixing a module housing 22 to the seat frame 16 with threaded fasteners (not shown) such that the module 10 is recessed inside the assembled seat 12 within the seat back foam cushion. An inflator 24 is received by the module housing 22 and provides generated gases which inflate the air bag 20. In order to retain the air bag 20, a retainer 26 is trapped between the inflator 24 and the housing 22 in a manner which engages a pair of flaps (not shown) on the air bag 20. A deployment cover 28 is provided on the housing 22 so as to facilitate pre-assembly of the entire module 10. The deployment cover 28 is snapped into the housing 22 and contains a tear seam through which the air bag is deployed. An electrical cable 30 and connector 32 extend from the inflator 24 through the housing 22. The cable 30 and connector 32 carry electric signals from crash sensors (not shown) which activate air bag deployment upon sensing a side-impact collision. The tear seam provided in the trim 18 is designed to open upon inflation of the air bag 20, allowing deployment of the inflating air bag 20 in response to the electrical crash signal from the appropriate sensor (not shown).

The air bag 20 is configured to be kidney shaped when inflated to optimize the protection area of the occupant while eliminating excess volume. The bag shape may be maintained by any combination of zero tethers, normal tethers or breakaway tethers (tethers sewn on like zero tethers, but configured to tear away as the air bag fills). Upon receiving a crash signal from a crash sensor, the inflator 24 generates gas which is directed into the air bag 20 in the lower thorax region 34 of the air bag. In the preferred embodiment, the thorax region 34 comprises the lower two-thirds of the air bag volume, while the head region 36 comprises the upper one-third. The generated gas is trapped inside the air bag 20 first inflating the thorax region 34 then subsequently inflating the head region 36. Since the occupant will load the thorax region 34 first with his hip and torso, the thorax region 34 is inflated first. The load placed on the thorax region 34 by the occupant forces the gas up into the head region 36 keeping the head region 36 inflated until the occupant's head loads the head region 36. Upon loading of the head region 36, gas is vented to atmosphere by a vent 38 located in the head region 36.

The kidney shaped design of the air bag 20 of the present invention allows the air bag 20 to be inflated quicker since excess volume is eliminated. It is also possible to pack the air bag 20 into a smaller storage area since a smaller inflator 24 may be used to inflate the air bag 20 due to the reduced volume. The inflation technique of the present invention, inflating the thorax region 34 first and allowing gases from the thorax region 34 to inflate the head region 36, provides an air bag 20 design which contains gas longer for improved protection and also allows for the use of larger volume air bags which protect larger occupants such as the 95th percentlie male. The flow of gas into the head region 36 is delayed for improved head protection in higher speed impacts and the single bag design reduces the manufacturing, installation and maintenance costs of the system.

Figure 4:
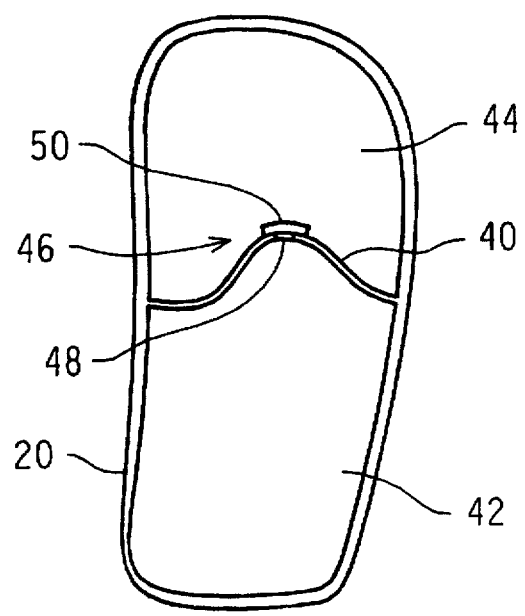
FIG. 4 is a cross section of another embodiment of the head/thorax cushion of this invention.

In another embodiment, as shown in FIG. 4, the thorax and head sections, 34 and 36 respectively, are divided into separate inflation chambers. A divider 40 divides the air bag 20 into a thorax chamber 42 and a head chamber 44. The divider 40 of FIG. 4 is configured as a panel of material having a divider flow valve 46. However, the divider 40 could also be a breakaway sew line or intermediate sew line, with a schematically shown in FIGS. 5A–5E, a flow orifice 48. The divider 40 is designed to ensure that the thorax chamber 42 is inflated before the head chamber 44. During deployment of the air bag 20, the thorax chamber 42 is inflated by the inflator 24 and the head chamber is inflated from the thorax chamber 42 through the divider flow valve 46. Preferably, the divider flow valve 46 is a one-way flow valve which substantially retains inflation gases in the head chamber 44. Alternatively, the divider flow valve 46 is sized to provide larger volumetric flow rates between the thorax and head chambers, 42 and 44 respectively, than through the exhaust vent 38 between the head chamber 44 and atmosphere.

Figure 5A:
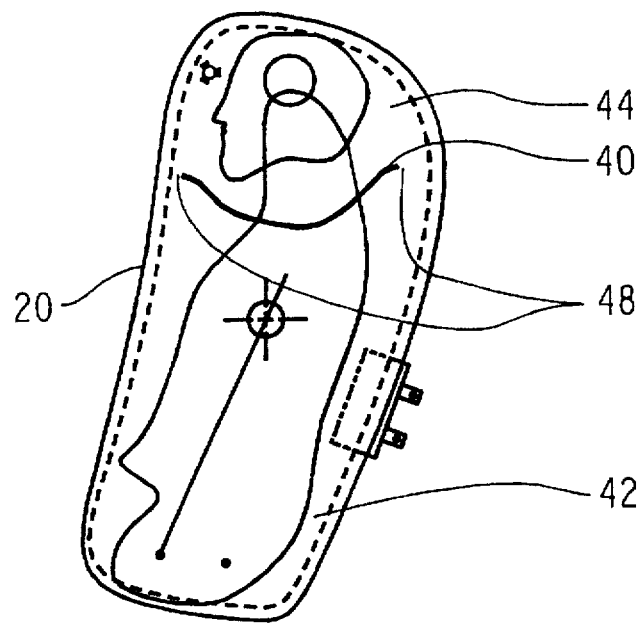
FIGS. 5 a through e are schematic side views of alternative embodiments of the divider of the head/thorax cushion of this invention.
Figure 5B:
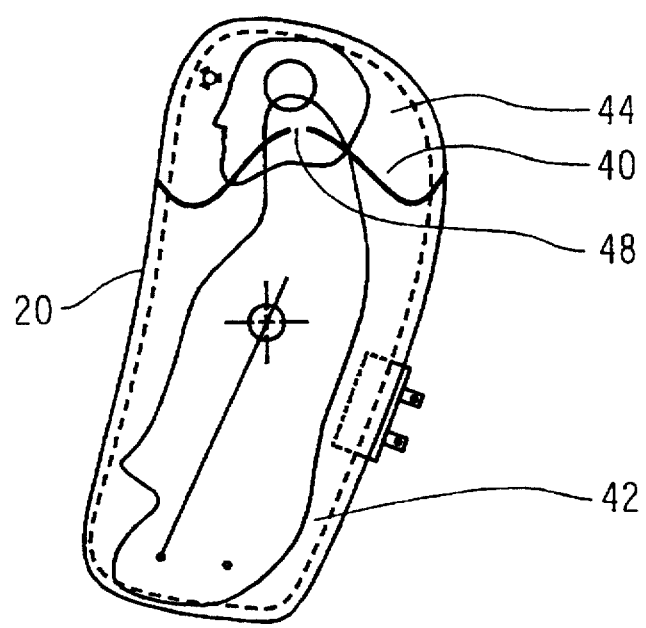
Figure 5C:
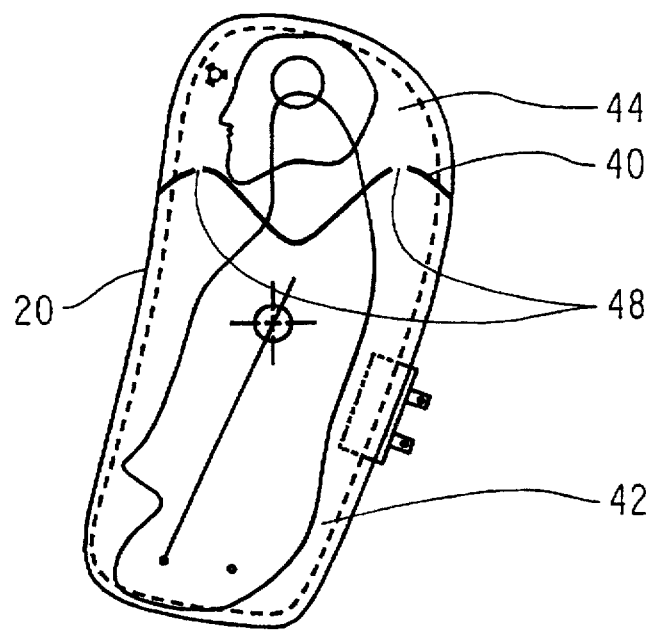
Figure 5D:
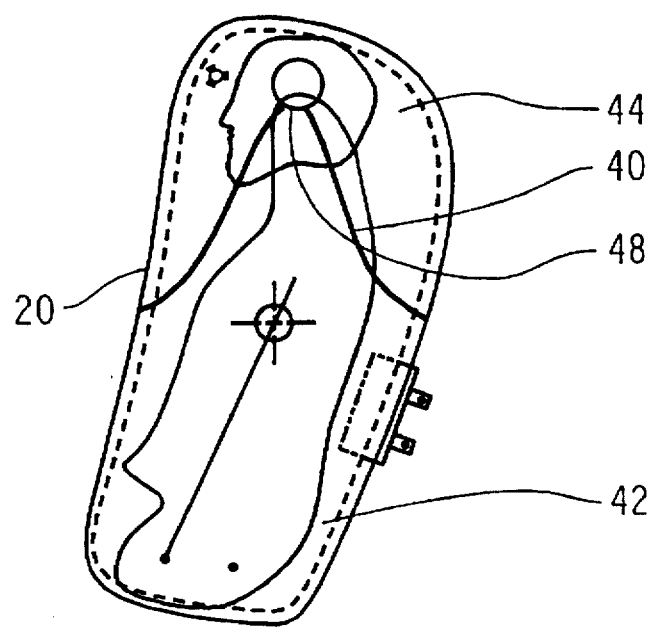
Figure 5E:
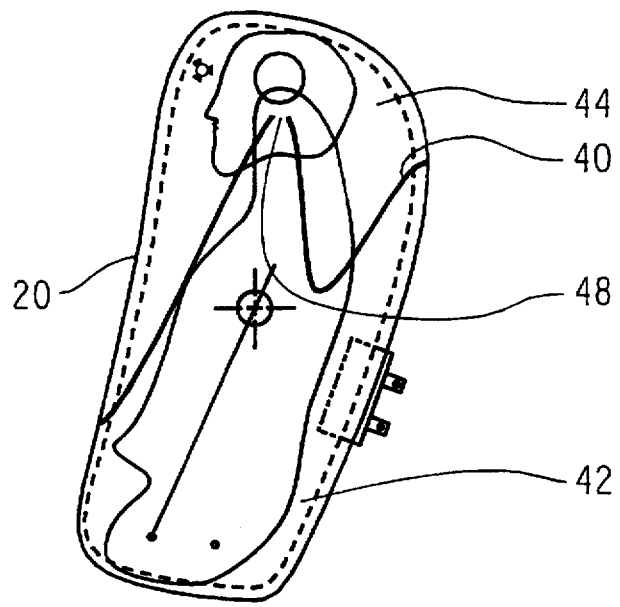

In order to avoid having the divider 40 act as a hinge line, the divider 40 is configured to have a waviness as shown in FIG. 4. If a straight, horizontal divider 40 is used, it is possible that the head chamber 44 may rotate excessively around the divider 40. If a straight, horizontal divider 40 is used, breakaway sew lines should be used which fail under a certain load as the gases are forced into the head chamber to eliminate rotation and maintain a good inflation of the cushion. FIGS. 5a through 5e provide alternative embodiments of divider 40 of FIG. 4. As shown in FIGS. 5(b)–(d), the waviness is a substantially curved path which can be best described as sinusoidal in form. FIGS. 5d and 5e illustrate divider 40 configurations which provide a smaller thorax chamber volume thus allowing the use of a lower output inflator 24.

Figure 6:
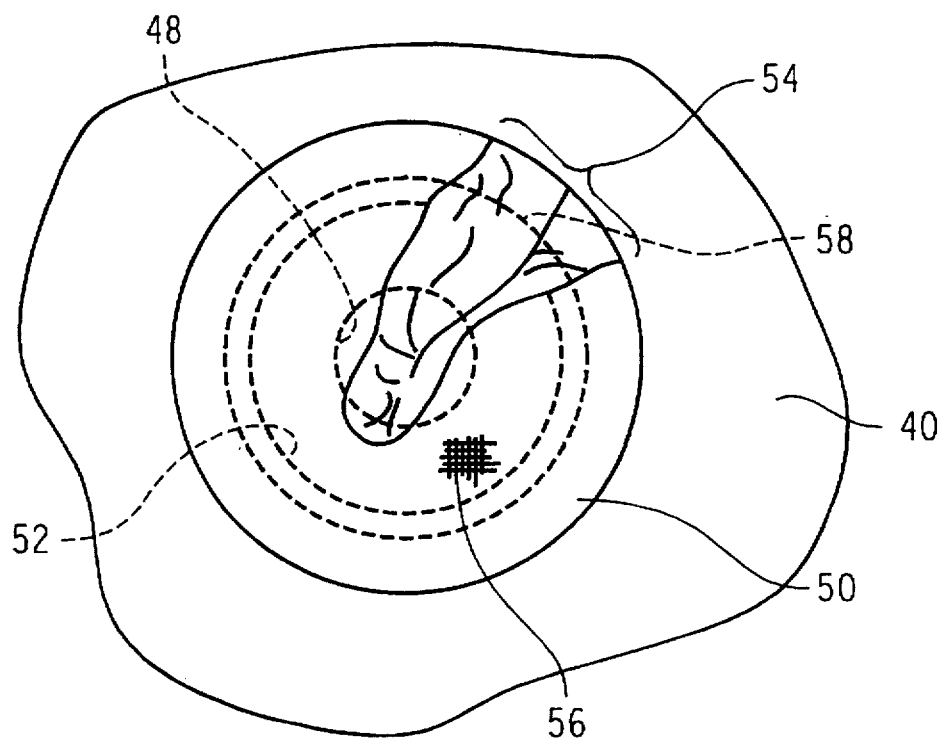
FIG. 6 is a fragmentary view of the divider showing a preferred divider flow valve according to this invention.

Preferably, the divider flow valve 46 is a flow orifice 48 provided in the divider 40 having a flow restricting flap 50, which is retained over the flow orifice 48 by stitching the flap 50 along a semi-circumferential border region to provide a flap valve on the head chamber 44 side of the divider 40. The flap 50 allows a substantially one-way flow of gas into the head chamber 44 by puckering in relation to the divider 40. When subjected to thorax chamber 42 gas pressures, the flap 50 allows inflation gas flow through the unstitched border region of the flap 50. When gas pressure in the head chamber 44 exceeds the pressure in the thorax chamber 42, the pucker flattens out, sealing the flap 50. Alternatively the flap 50 can be formed from a fabric weave material having pores, shown schematically at 56 in FIG. 6, between its weft and warp threads which allow gas to pass through the flap 50 at a controlled and relatively slow rate.

The divider flow valve 46 is formed by sewing the flow restricting flap 50 over the flow orifice 48 with a semi-circumferential double row of stitches 52. A vent gap 54 is formed between the flow flap 50 and the divider 40 along a circumferential region which complements the semi-circumferential row of stitches 52. The flap 50 is sewn to the head chamber 44 side of the divider 40 such that inflation pressures exerted by inflation gases in the thorax chamber 42 produce pressure on the flap 50 which puckers and displaces the flap 50 along the gap 54. Inflation gases pass through the puckered flap 50 into the head chamber 44 such that the head chamber 44 is inflated by the gases.

Construction of a divider flow valve 46 in the manner detailed above produces a substantially one-way valve which allows substantially one-way flow of inflation gases from the thorax chamber 42 into the head chamber 44. Once the pressure in the head chamber 44 exceeds the pressure in the thorax chamber 42, the puckered flap 50 flattens out which seals the flap 50 to the divider 40.

The divider flow valve 46 can alternatively be configured by completely sewing the flap 50 over the flow orifice 48. In one version, the flap 50 is formed from fabric weave material which ruptures to form enlarged pores, shown schematically at 56 in FIG. 6, through which gas flows when subjected to an overpressure from the thorax chamber 42. Alternatively, the flap 50 can be sewn over the orifice 48 first with a semi-circumferential row of stitches 52 which are enforced and which do not fail under pressure, and secondly with a crescent shaped row of stitches 58 which circumferentially complement stitches 52 to fully seal the flap 50 over the orifice 48. In the second case, stitches 58 are rupturable at a predetermined load, as applied to the flap 50, from pressure with the thorax chamber 42 such that they rupture and allow flow from the thorax chamber 42 into the head chamber 44 once pressure in the thorax chamber 42 reaches a critical value. Other alternatives include a flap 50 sewn with a series of stitches which completely rupture under load and provide for gas flow from the thorax chamber 42 into the head chamber 44 or a flap 50 sewn along one edge such that the flap 50 displaces to allow pressurized gas from the thorax chamber 42 into the head chamber 44 but displaces in sealed engagement with the divider 40 as gas from the head chamber 44 attempts to backflow into the thorax chamber 42.

It is also possible to accomplish the objects of this invention by configuring the thorax and head chambers without a flow valve but having a limited flow passage. The limited flow passage will retain gas in the thorax chamber while the head chamber is inflated by gases passing through the limited flow passage.

In operation, upon receiving a crash signal the inflator 24 generates gas which is directed into the thorax chamber 42 of the air bag 20 thus inflating the thorax chamber 42. Upon loading of the thorax chamber 42 by the occupant, the rupturable seam 58 of the flow valve 46 ruptures opening the gap 54 in the flow orifice 48 and allowing gas to flow from the thorax chamber 42 into the head chamber 44 thus inflating the head chamber 44. When the pressure in the head chamber 44 exceed the pressure in the thorax chamber 42, the flap 50 puckers into the flow orifice 48 sealing the flow valve 46 preventing the gas from reverse flow back into the thorax chamber 42. Upon loading of the head chamber 44 by the occupant's head, gas is vented to atmosphere through an exhaust vent 38 in the head chamber 44.

It is to be understood that the invention is not limited to the exact construction illustrated and described above, but that various changes and modifications may be made without departing from the spirit and scope of the invention as defined in the following claims.

We claim:

1. An inflatable restraint system for protecting the head and thorax regions of a motor vehicle occupant in response to a side impact collision, the system comprising:

an inflatable single air bag having a separate thorax chamber and head chamber and being configured to be inflated into a deployed condition between the occupant and a side door of the motor vehicle in an area generally extending from adjacent the occupant's hip to adjacent the occupant's head, wherein said air bag provides impact protection for the occupant's head and thorax regions, said thorax chamber and said head chamber having a divider secured therebetween isolating said head chamber from said thorax chamber wherein said divider comprises a panel of material having a one-way flow orifice configured to open upon loading of the thorax chamber;

said one-way flow orifice having a flow restricting flap retained over said flow orifice in said divider, said flap retained to said divider with a semi-circular first row of enforced stitches and a complementary semi-circular second row of load-rupturable stitches arranged with said first row of stitches to seal said flap with said divider wherein said second row of stitches rupture under desired load to provide flow of inflation gases from said thorax chamber into said head chamber through said flow orifice; and means for inflating said air bag in response to said side impact collision, such that said air bag is inflated by first inflating said thorax chamber and secondly, as pressure of said gas in said thorax chamber increases to a critical value, said divider allows gas to pass from said thorax chamber into said head chamber thus inflating said head chamber.

2. An inflatable restraint system according to claim 1 further comprising a vent hole located in said head chamber for venting gas from said head chamber to atmosphere.

3. An inflatable restraint system according to claim 1 further comprising vents for venting gas from said air bag when said air bag is fully loaded.

4. An inflatable restraint system according to claim 3 wherein said vents are located in said head chamber of said air bag.

5. An inflatable restraint system according to claim 1 wherein said air bag is folded and stored in an air bag module in a seat back of the vehicle when undeployed.

6. An inflatable restraint system according to claim 1 wherein said thorax chamber comprises approximately the lower two-thirds of said air bag volume.

7. An inflatable restraint system according to claim 1 wherein said head chamber comprises approximately the upper one-third of said air bag volume.

8. An inflatable restraint system for protecting the head and thorax regions of a motor vehicle occupant in response to a side impact collision, said inflatable restraint system comprising:

an inflatable air bag having an intermediate sew line creating a divider therein, said divider generally separating said air bag into a thorax chamber and a head chamber, said divider having a flow orifice for communication of a gas from said thorax chamber to said head chamber;

an inflater for providing gasses to inflate said air bag in response to said side impact collision wherein said thorax chamber is first inflated by said gas and said head chamber is subsequently inflated by said gas passing from said thorax chamber to said head chamber by way of said flow orifice; and wherein said intermediate sew line extends in a substantially curved path such that when inflated, said head chamber exhibits cross-sectional properties along said divider sufficient to prevent said head chamber from excessive rotation about said divider when said head chamber is contacted by said occupant's head during said side impact.

9. The inflatable restraint system of claim 8 wherein said intermediate sew line is arcuate.

10. The inflatable restraint system of claim 8 wherein said intermediate sew line is substantially sinusoidal.

* * * * *